2,977,211
METHOD FOR CONTROLLING VEGETATION USING POLYHALOGENATED TOLUENES

Kenneth L. Godfrey, St. Albans, W. Va., assignor to Monsanto Chemical Company, St. Louis, Mo., a corporation of Delaware No Drawing. Filed May 6, 1957, Ser. No. 657,012

11 Claims. (Cl. 71—2.3)

This invention relates to pesticide compositions containing as the essential active ingredient halogenated toluenes and to methods of pest control employing them.

The invention particularly relates to methods of destroying or controlling undesired vegetation by applying thereto an effective concentration of certain halogen substituted toluenes hereinafter described. While halogenated carbocyclic compounds have been proposed as carriers for pesticides, the classes described herein are primary toxicants, although they too may be used in conjunction with other active ingredients if desired.

It has been found that a composite chlorination product prepared by chlorinating toluene in the ring until the gain in weight corresponds to that calculated for trichlorotoluene possesses outstanding biological activity. Bromine may replace chlorine in these products. They possess both pre-emergence and foliage contact herbicidal properties. The composite mixture is superior to any component known to be present. While halogenation of the side chain is permissible, the compounds having halogen only in the ring possess the advantage of reduced damage to adjacent crop areas.

Polyhalogenated toluenes having all the halogen present in the carbocyclic ring possess significant herbicidal properties. Examples comprise 2,3-dichlorotoluene, 2,6-dichlorotoluene, 2,4,5 - trichlorotoluene, 2,4,6 - trichlorotoluene, 2,3,6 - trichlorotoluene, 2,3,4 - trichlorotoluene, 2,3,5-trichlorotoluene, 2,4,5-tribromotoluene, 2,4,6-tribromotoluene, 2,3,6 - tribromotoluene, 2,3,5,6 - tetrachlorotoluene and 2,3,4,5-tetrachlorotoluene.

The new toxicants may be applied conveniently in the form of a spray containing the active ingredient in a concentration within the range of 0.1% to 10% by weight. Thorough coverage of the foliage is effective for contact killing. For pre-emergence control of plants amounts within the range of 5–100 pounds per acre comprise a range useful for most purposes. Weeds from the following plant families are controlled to varying degrees: Leguminosae, Cucurbitaceae, Umbelliferae, Chenopodiaceae, Amaranthaceae, Convolvulaceae and Aizoaceae. At concentrations within the range of 35–100 pounds per acre the compositions comprise soil sterilants which destroy all plant life as well as some animal pests.

The toxicants are generally liquids or low melting solids emulsifiable in water and preferably are applied in this form. As dispersing and wetting agents to aid in the formation of dispersions and emulsions there may be mentioned soft or hard sodium or potassium soaps, alkylated aromatic sodium sulfonates such as sodium dodecyl benzene sulfonate or an amine salt of dodecyl benzene sulfonic acid, alkali metal salts of sulfated fatty alcohols, ethylene oxide condensation products of alkyl phenols, tall oil or higher alkyl mercaptans.

The table below illustrates the properties of polyhalogenated toluene. The material was emulsified in water by the aid of an emulsifying agent and applied as a spray containing the concentration of the active ingredient shown. The spray was applied to the foliage of grass, to the foliage of bean plants and the foliage of a mixture of broadleaved plants and the effects recorded. For convenience in recording the data the following rating key was used:

| | |
|---|---|
| No phytotoxicity | 0 |
| Slight phytotoxicity | 1 |
| Moderate phytotoxicity | 2 |
| Severe phytotoxicity | 3 |
| Plant dead | 4 |

Trichlorotoluene was prepared by the following procedure: Substantially 1500 parts by weight of dry toluene was charged into a chlorinator of suitable capacity. Substantially 15 parts by weight of iron filings were added as catalyst carrier for ring chlorination and chlorine introduced at about 20° C. During the last part of the run the temperature was increased to about 70° C. in order to keep the reaction mixture fluid and the flow of chlorine continued until the increase in weight corresponded to that calculated for trichlorotoluene. Thus, when the product analyzed 54.8% chlorine, the flow of chlorine was interrupted and the trichlorotoluene given a 10% caustic wash and filtered through a bed of clay in order to remove the iron. Alternatively, the iron may be removed by distillation of the chlorinated product. The product is designated ar,ar,ar-trichlorotoluene in the table below:

Table I

| Active Ingredient | Conc., percent | Phytotoxicity Rating | | |
|---|---|---|---|---|
| | | Grass | Bean | Broadleaf |
| ar,ar,ar-Trichlorotoluene | 1 | 2 | 1 | 2+ |

Pre-emergence tests were carried out by applying the composition to the soil of seeded plots before any plants emerged. Formative effects were observed on all broadleaf plants. The phytotoxicity ratings at 25 pounds per acre are recorded below:

Table II

| Plant | Phytotoxicity Rating at 25#/Acre |
|---|---|
| Wild oat | 0 |
| Rye grass | 0 |
| Buckwheat | 3 |
| Brome-cheat grass | 0 |
| Mustard | 3 |
| Red clover | 3 |
| Sugar beet | 3 |
| Cucumber | 3 |
| Cotton | 3 |
| Morning glory | 3 |

Further biological activity was demonstrated by observing the effect on aquatic organisms of ar,ar,ar-trichlorotoluene. At a concentration of 5 parts per million it destroyed coontail (Ceratophyllum), guppies and snails and was severely toxic to Elodea (Anacharis).

It is possible to formulate dry compositions by absorbing chlorotoluene on finely divided powdered carriers as for example talc, clay, pyrophyllite, silica and fuller's earth. The resulting compositions may be applied as dusts, or further diluted with liquid carriers.

It is intended to cover all changes and modifications of the examples of the invention herein chosen for purposes of disclosure which do not constitute departures from the spirit and scope of the invention.

What is claimed is:
1. A method of controlling vegetation which comprises applying to the soil medium containing germinating seedlings of broadleaved plants as an essential active toxicant a phytotoxic concentration of trihalogenated toluene containing all the halogen in the carbocyclic ring which halogen is selected from the group consisting of chlorine, bromine and mixtures thereof at least 1 halogen atom being adjacent to the methyl group.

2. A method of controlling vegetation which comprises applying to the soil medium containing germinating seedlings of broadleaved plants as an essential active toxicant a phytotoxic concentration of trichlorinated toluene containing all the chlorine in the carbocyclic ring at least 1 being adjacent to the methyl group.

3. A method of controlling vegetation which comprises applying to the soil medium containing germinating seedlings of broadleaved plants as an essential active toxicant a phytotoxic concentration of mixed isomers of chlorinated toluene containing an average of three chlorine atoms all in the carbocyclic ring.

4. A method of controlling vegetation which comprises applying to the soil medium containing germinating seedlings of broadleaved plants as an essential active toxicant a phytotoxic concentration of 2,3,6-trichlorotoluene.

5. The method of controlling vegetation which comprises applying to the soil medium containing germinating seedlings of broadleaved plants as an essential active toxicant a phytotoxic concentration of 2,3,4-trichlorotoluene.

6. The method of controlling vegetation which comprises applying to the soil medium containing germinating seedlings of broadleaved plants as an essential active toxicant a phytotoxic concentration of 2,3,5,6-tetrachlorotoluene.

7. The method of controlling vegetation which comprises applying to the soil medium containing germinating seedlings of broadleaved plants as an essential active toxicant a phytotoxic concentration of 2,3,5-trichlorotoluene.

8. A method of controlling vegetation which comprises applying to the soil medium containing germinating seedlings of broadleaved plants as an essential active toxicant a phytotoxic concentration of 2,3,4,5-tetrachlorotoluene.

9. The method of destroying aquatic weeds which comprises applying to the aqueous medium in contact with aquatic weeds a phytotoxic concentration of mixed isomers of chlorinated toluene containing an average of three chlorine atoms all in the carbocyclic ring.

10. A method of controlling vegetation which comprises applying to the soil medium containing germinating seedlings of broadleaved plants as an essential active toxicant a phytotoxic concentration of a mixture of trihalogenated toluenes which contain all the halogen in the carbocyclic ring which halogen is selected from the group consisting of chlorine, bromine and mixtures thereof at least one halogen being adjacent to the methyl group.

11. A method of controlling vegetation which comprises applying to the soil medium containing germinating seedlings of broadleaved plants as an essential active toxicant a phytotoxic concentration of a mixture of trichlorinated toluenes which contain all the chlorine in the carbocyclic ring at least one chlorine being adjacent to the methyl group.

References Cited in the file of this patent

UNITED STATES PATENTS 2,422,769     Blake et al. _____ June 24, 1947

FOREIGN PATENTS 289,002      Switzerland _____ June 16, 1953

OTHER REFERENCES

Simonet et al., in "C.R. Societe de Biologie," vol. 131, 1939, pages 222 to 224.

Article in "J. Amer. Water Works Assn.," February 1946, pp. 195 and 196.

Gibbons, in "Water Works and Sewerage," May 1940, p. 231.

Leonard et al., in "Southern Weed Conference—3rd Proceedings," February 1950, p. 91.

Owens, in "Chemical Abstracts," vol. 48, col. 7243(g), 1954.